US010853347B2

(12) United States Patent
Legler et al.

(10) Patent No.: US 10,853,347 B2
(45) Date of Patent: Dec. 1, 2020

(54) DEPENDENCY-BASED METADATA RETRIEVAL AND UPDATE

(71) Applicant: Microsoft Technology Licensing, LLC, Redmond, WA (US)

(72) Inventors: Ian Carl Legler, Redmond, WA (US); Hitesh Kapoor, Redmond, WA (US); Manoj Lalavat, Bellevue, WA (US); Lakshaya Goel, Bellevue, WA (US); Alexander Argutin, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 677 days.

(21) Appl. No.: 15/476,700

(22) Filed: Mar. 31, 2017

(65) Prior Publication Data

US 2018/0285403 A1 Oct. 4, 2018

(51) Int. Cl.
*G06F 16/00* (2019.01)
*G06F 16/23* (2019.01)
*G06F 16/22* (2019.01)
*G06F 16/2458* (2019.01)

(52) U.S. Cl.
CPC ...... *G06F 16/2329* (2019.01); *G06F 16/2246* (2019.01); *G06F 16/2474* (2019.01)

(58) Field of Classification Search
CPC ............ G06F 16/2329; G06F 16/2246; G06F 16/2474; G06F 16/1873; G06F 16/27
See application file for complete search history.

(56) References Cited

U.S. PATENT DOCUMENTS

| 7,236,966 | B1 * | 6/2007 | Jackson | G06F 16/9535 |
| 7,409,634 | B2 | 8/2008 | Davis et al. | |
| 7,421,458 | B1 * | 9/2008 | Taylor | G06F 16/289 |
| 7,761,456 | B1 * | 7/2010 | Cram | G06F 11/1469 |
| | | | | 707/754 |
| 7,840,547 | B1 * | 11/2010 | Tucker | G06F 16/248 |
| | | | | 707/706 |

(Continued)

OTHER PUBLICATIONS

"Metadata API Developer Guide", http://web.archive.org/web/20150325201922/https://developer.salesforce.com/docs/atlas.en-us.api_meta.meta/api_meta/file_based.htm, Published on: Mar. 25, 2015, 4 pages.

(Continued)

*Primary Examiner* — Noosha Arjomandi
(74) *Attorney, Agent, or Firm* — Mannava & Kang, P.C.

(57) ABSTRACT

In some examples, dependency-based metadata retrieval and update may include receiving a query for an update of metadata associated with an application. The query may include a previous version associated with a previous synchronization of the metadata. Alternatively or additionally, the query may include a metadata tree associated with the metadata. Dependency based metadata retrieval and update may further include generating, based on the query and a dependency tree, a response to include the update that includes a modification to a metadata fragment of the metadata. The dependency tree may include a parent and child relationship between each of a plurality of metadata fragments including the metadata fragment, and may further include versions associated with the plurality of metadata fragments.

19 Claims, 15 Drawing Sheets

(56) References Cited

U.S. PATENT DOCUMENTS

| | | | |
|---|---|---|---|
| 8,266,122 B1* | 9/2012 | Newcombe | G06F 16/80 |
| | | | 707/695 |
| 8,504,523 B2* | 8/2013 | Starkey | G06F 16/27 |
| | | | 707/638 |
| 8,578,278 B2 | 11/2013 | Rauh et al. | |
| 8,799,319 B2 | 8/2014 | Srinivasan et al. | |
| 9,269,060 B2 | 2/2016 | Maes | |
| 9,633,048 B1* | 4/2017 | Dutta | G06F 16/5838 |
| 9,652,485 B1* | 5/2017 | Bhargava | G06F 16/1774 |
| 10,284,753 B1* | 5/2019 | Naik | H04N 21/8146 |
| 2003/0097365 A1* | 5/2003 | Stickler | H04N 21/85406 |
| 2005/0044064 A1* | 2/2005 | Haase | G06F 16/24552 |
| 2006/0036580 A1* | 2/2006 | Stata | G06F 16/3349 |
| 2007/0143339 A1* | 6/2007 | Springett | G06F 16/252 |
| 2007/0168535 A1 | 7/2007 | Ikonen et al. | |
| 2007/0220035 A1 | 9/2007 | Misovski | |
| 2008/0172451 A1 | 7/2008 | Kim et al. | |
| 2008/0263142 A1 | 10/2008 | Glass et al. | |
| 2009/0037431 A1* | 2/2009 | Martino | G06Q 30/02 |
| 2009/0138503 A1* | 5/2009 | Chowdhury | G06F 16/9027 |
| 2009/0187826 A1* | 7/2009 | Heimbold | H04N 5/262 |
| | | | 715/719 |
| 2009/0327277 A1* | 12/2009 | Sanborn | G06F 40/103 |
| 2010/0030752 A1* | 2/2010 | Goldentouch | G06F 16/81 |
| | | | 707/797 |
| 2011/0126232 A1* | 5/2011 | Lee | H04N 5/765 |
| | | | 725/39 |
| 2012/0271676 A1* | 10/2012 | Aravamudan | G06Q 10/1093 |
| | | | 705/7.18 |
| 2014/0006351 A1* | 1/2014 | Laitkorpi | G06F 16/275 |
| | | | 707/634 |
| 2014/0040714 A1* | 2/2014 | Siegel | G06F 16/93 |
| | | | 715/203 |
| 2014/0244766 A1 | 8/2014 | Mo et al. | |
| 2015/0052158 A1 | 2/2015 | Bishop et al. | |
| 2016/0070680 A1 | 3/2016 | Wagner | |
| 2016/0164947 A1 | 6/2016 | Calvin et al. | |
| 2016/0313916 A1* | 10/2016 | Sivananainthaperumal | G06F 3/0644 |
| 2017/0075965 A1* | 3/2017 | Liu | G06F 16/27 |
| 2018/0075078 A1* | 3/2018 | Dandy | G06F 16/2358 |
| 2018/0143747 A1* | 5/2018 | Sakai | G06F 3/04817 |
| 2018/0189334 A1* | 7/2018 | Cong | G06F 16/22 |

OTHER PUBLICATIONS

"Fusion Middleware Metadata Repository Bulder's Guide for Oracle Business Intelligence Enterprise Edition", http://docs.oracle.com/cd/E23943_01/bi.1111/e10540/toc.htm, Retrieved on: Dec. 28, 2016, 29 pages.

* cited by examiner

FIG. 4

```
{
  "CustomControls" : [{
    "CustomControlId" : "16fccbeb-fe6b-44d2-ba70-11f1f63ae7ca",
    "Name" : "MscrmControls.Containers.FieldSectionItem",
    "ConstructorName" : "FieldSectionItem",
    "VersionNumber": "0x0000000000041455",
    ...
  }
  ],
  "Forms" : [{
    "FormId" : "a91390a5-99bb-4d10-9eee-3a5c87f841f1",
    "VersionNumber": "0x0000000000041322",
    "TabAttributes" : {
     "addedby" : null,
     "filterby" : null,
     "dashboardCategory" : null,
     "timeframe" : null,
     "primaryentitylogicalname" : null,
     "entityview" : null,
     "tilepresent" : false
    },
    "Tabs" : [{
      "Columns" : [{
        "Sections" : [{
          "Rows" : [{
             "Visible" : true,
             "Height" : null,
             "Cells" : [{
                "ColSpan" : 2,
                "RowSpan" : 1,
                "AutoExpand" : false,
                ...
             }, ...],
          }, ...]
        }, ...],
      }, ...],
    }, ...
  ],
  "Labels" : [{
     "Id" : "db99f6ca-2241-db11-898a-0007e9e17ebd",
     "LabelColumnName" : "displayname",
     "Value" : "Phone Call",
     "VersionNumber": "0x0000000000051218",
```

1000 →  (pointing to CustomControls block)

1002 → (pointing to Labels Id/VersionNumber)

DEPENDENCY-BASED METADATA RETRIEVAL AND UPDATE

BACKGROUND

Metadata may be described as data that is used to provide information on other types of data. An application may use metadata to operate in a specified manner. For example, an application may ascertain metadata for a form to generate the form to include a specified layout, and/or to include specified controls for implementing various operations associated with the form.

BRIEF DESCRIPTION OF DRAWINGS

Features of the present disclosure are illustrated by way of example and not limited in the following figure(s), in which like numerals indicate like elements, in which:

FIG. 4 illustrates a modification of the dependency table of FIG. 3 in accordance with an embodiment of the present disclosure;

FIG. 10 illustrates a response that is generated for metadata retrieval for the "form" metadata fragment of FIG. 7 in accordance with an embodiment of the present disclosure;

DETAILED DESCRIPTION

Figure 1:
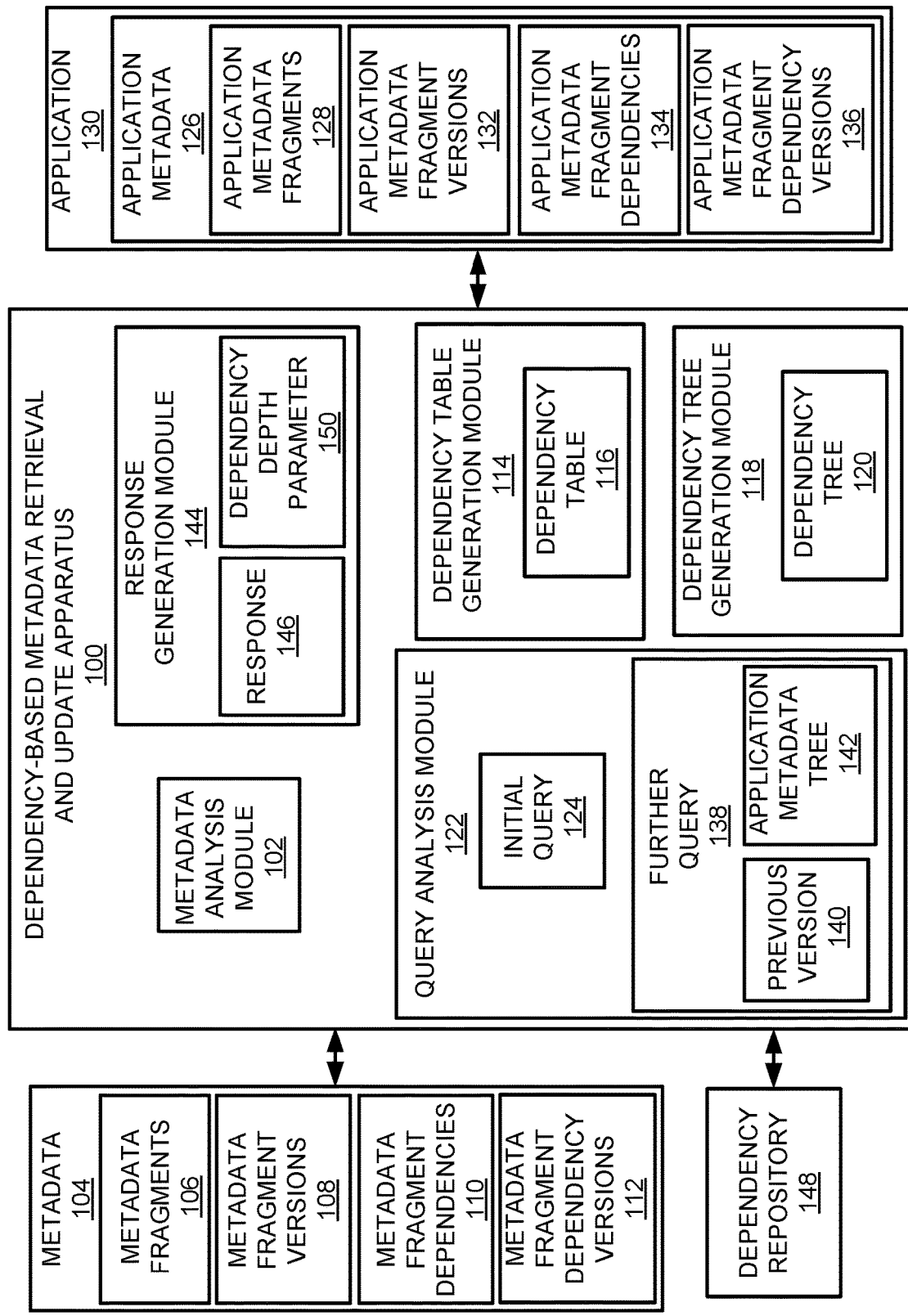
FIG. 1 illustrates a layout of a dependency-based metadata retrieval and update apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Dependency based metadata retrieval and update apparatuses, methods for dependency-based metadata retrieval and update, and non-transitory computer readable media having stored thereon machine readable instructions to provide dependency-based metadata retrieval and update are disclosed herein. The apparatuses, methods, and non-transitory computer readable media disclosed herein provide for generating, based on a query that includes a previous version associated with a previous synchronization of application metadata, or a query that includes an application metadata tree (e.g., an application metadata forest for a query that includes a plurality of application metadata trees) associated with the application metadata, a response to include a modification to an application metadata fragment of the application metadata. A metadata fragment may be described as a subset of metadata.

The terms "application metadata", "application metadata tree", "application metadata fragment", "application metadata fragment version", "application metadata fragment dependency" and "application metadata fragment dependency version" may be used to describe attributes of metadata associated with an application, for example, on a client that generates the query as disclosed herein. The terms "dependency tree", "metadata fragment", "metadata fragment version", "metadata fragment dependency" and "metadata fragment dependency version" may be used to describe attributes of metadata, for example, on a server that receives the query as disclosed herein. The term "version" as disclosed herein may be described as a "version element", where the "version element" includes, for example, a version number, a timestamp, or another attribute associated with metadata.

With respect to the apparatuses, methods, and non-transitory computer readable media disclosed herein, in a relationship such as a client and a server, a client-side application (designated "application" hereinafter) may implement a metadata-driven design. That is, with respect to operation of the application, the client may retrieve metadata from a server or a plurality of servers, process the metadata, and operate the application in a manner defined by the metadata. Such metadata may describe complex structures such as "forms", "views", "controls", etc., with respect to the application. Each of these structures may include entity-specific metadata, detailed schema of relationships between internal metadata fragments, and a set of the metadata fragments. For example, for a "form", the entity-specific metadata may include "form type". The metadata fragments may be described as a subset of the metadata, where each subset may represent a description of a particular aspect of an application. Metadata fragments may include, for example, an eXtensible Markup Language (XML) document of internal tabs, sections, regions, and controls associated with the application. For example, a metadata fragment may include a "form," which represents a rendering of data. The "form"

may include a set of information stored in a database, where the information represents the behavior of certain aspects of an application, specific customizations, dependencies with respect to other parts of the metadata, etc.

A technical challenge associated with metadata retrieval is that metadata that is retrieved from heterogeneous sources may need to be analyzed to determine aspects such as metadata content, and/or dependencies between metadata fragments. Another technical challenge associated with updating metadata is that in order to update the retrieved metadata, heterogeneous sources may need to be queried to determine which aspects such as metadata content, and/or dependencies between metadata fragments have been updated for metadata that was previously retrieved.

In order to address at least these technical challenges with respect to metadata retrieval and/or update, the apparatuses, methods, and non-transitory computer readable media disclosed herein provide for reduction in the time and resource utilization associated with metadata retrieval, for example, by eliminating the time associated with traversal of detailed relationship schemes associated with different metadata fragments, and instead utilizing a pre-populated dependency tree. The pre-populated dependency tree may be stored in a dependency repository. In this regard, the relationship schemes associated with the different metadata fragments may be predetermined, which thus eliminates the need to determine relationship schemes upon metadata retrieval.

The apparatuses, methods, and non-transitory computer readable media disclosed herein further provide for the implementation of incremental metadata retrieval and/or update. In this regard, the incremental metadata retrieval and/or update provides for the reduction of network traffic, for example, based on the comparison of versions for dependencies and metadata fragments of the dependency tree with information received, for example, from a client. The version may include a version number, and/or a timestamp.

According to an embodiment, incremental metadata retrieval and/or update may be performed based on a query (e.g., by a client) that includes a previous version associated with a previous synchronization of application metadata. In this regard, the previous version associated with the query may be compared with metadata fragment versions and metadata fragment dependency versions of the dependency tree, and newer versions of the metadata fragments and/or the metadata fragment dependencies identified from the dependency tree may be returned in response to the query.

According to another embodiment, incremental metadata retrieval and/or update may be performed based on a query (e.g., by a client) that includes an application metadata tree (e.g., a forest of application metadata trees for a query that includes a plurality of application metadata trees) associated with the application metadata. In this regard, each version associated with the application metadata fragments of the application metadata tree included in the query may be compared with a corresponding metadata fragment version in the dependency tree. The application metadata tree may include a full or a partial tree of application metadata fragments. From information included in the application metadata fragments, unique application metadata fragment identifiers and application metadata fragment version may be sent to a server. The application metadata tree structure may or may not be preserved depending on the implementation. The information included in the application metadata fragments may be denoted "application metadata header forest". Each particular piece of this information (application metadata fragment identifier and application metadata fragment version) may be denoted "application metadata header".

According to another embodiment, with respect to the queries described above, a response may be generated and may include a modification to an application metadata fragment of the application metadata. Upon receiving the response, for example by a client that generates the query, the client may determine whether the application metadata associated with the application is to be modified based upon the received response.

The apparatuses, methods, and non-transitory computer readable media disclosed herein further provide for metadata extensibility. In this regard, metadata fragments may be respectively added and/or removed to and/or from a dependency tree at runtime. For example, for metadata fragments that are respectively added to a dependency tree and/or removed from a dependency tree at runtime, the incremental metadata retrieval and/or update as disclosed herein may be used to retrieve and/or update the application metadata to account for changes to the metadata fragments with respect to the dependency tree.

Instead of or in addition to being used with metadata retrieval and/or update, the apparatuses, methods, and non-transitory computer readable media disclosed herein may be used for any type of incremental heterogeneous information retrieval and/or update. For example, instead of metadata, other types of fragments of heterogeneous information pointing to each other may be homogenized by introducing a hierarchical relationship table and a dependency tree. Further retrieval and/or update of the fragments of heterogeneous information may be performed in a similar manner as disclosed herein.

For the apparatuses, methods, and non-transitory computer readable media disclosed herein, modules, as described herein, may be any combination of hardware and programming to implement the functionalities of the respective modules. In some examples, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of a dependency-based metadata retrieval and update apparatus (hereinafter also referred to as "apparatus 100") in accordance with an embodiment of the present disclosure.

Referring to FIG. 1, the apparatus 100 may include a metadata analysis module 102 to analyze metadata 104 to extract metadata fragments 106 from the metadata 104. According to an example, the apparatus 100 may be a server that implements the modules as disclosed herein. The metadata analysis module 102 may identify metadata fragment versions 108 of the metadata fragments 106.

As disclosed herein, a version may include a version number that is generated or modified based on generation of a metadata fragment or an update associated with a metadata fragment in the dependency tree 120, and/or a timestamp associated with generation or modification of a metadata fragment in the dependency tree 120.

The metadata analysis module 102 may further extract a parent-to-child relationship between each of the metadata fragments 106. The parent-to-child relationships may be linked as metadata fragment dependencies 110. The metadata analysis module 102 may identify metadata fragment dependency versions 112 for the metadata fragment dependencies 110.

A dependency table generation module 114 is to analyze the metadata fragments 106 and the associated parent-to-child relationship between each of the metadata fragments 106 to generate a dependency table 116. The dependency table 116 may include a listing of the metadata fragments 106, the associated parent-to-child relationship between each of the metadata fragments 106, and the metadata fragment dependency versions 112 for the metadata fragment dependencies 110. The metadata fragment dependencies 110 may be stored in other formats (e.g., tree format, listing, etc.) that specify the parent-to-child relationship between each of the metadata fragments 106, and the metadata fragment dependency versions 112.

A dependency tree generation module 118 is to analyze the dependency table 116 to generate a dependency tree 120. Alternatively, the dependency tree generation module 118 may analyze the dependency table 116 to generate a plurality of dependency trees (i.e., a forest of dependency trees). The dependency tree 120 may include a root metadata fragment that represents a parent metadata fragment, nodes that represent children, grand-children, etc., of the parent metadata fragment, and edges (or links) that include the parent-to-child dependencies between the different metadata fragments 106. The dependency tree 120 may further include the metadata fragment versions 108 and the metadata fragment dependency versions 112 associated with each edge of the dependency tree 120.

A query analysis module 122 is to receive an initial query 124 to retrieve application metadata 126 and dependencies associated with a plurality of application metadata fragments 128 of the application metadata 126 for an application 130. According to an example, the application 130 may include a client-side application, and the initial query 124 may be received from a client device, such as a personal computer (PC), and other such devices. The application metadata 126 may further include application metadata fragment versions 132 associated with the application metadata fragments 128, application metadata fragment dependencies 134 and application metadata dependency versions 136 with respect to dependencies between the application metadata fragments 128.

The query analysis module 122 is to receive, after the initial query 124, a further query 138 (hereinafter designated "query 138") for an update of the application metadata 126 associated with the application 130. The query 138 may include a previous version 140 associated with a previous synchronization of the application metadata 126. Alternatively, the query 138 may include an application metadata tree 142 (e.g., an application metadata forest for a query that includes a plurality of application metadata trees) associated with the application metadata 126. Alternatively, the query 138 may include unique application metadata fragment identifiers and application metadata fragment version.

With respect to the previous version 140, assuming that the query 138 includes version information about at least two application metadata fragments from the application metadata fragments 128, the previous version may represent an oldest version associated with a metadata fragment from the at least two application metadata fragments.

With respect to the initial query 124, a response generation module 144 is to generate, based on the initial query 124 and the dependency tree 120, a response 146 to include the metadata 104 (or a subset of the metadata 104), and associated metadata fragment versions 108, metadata fragment dependencies 110, and/or metadata fragment dependency versions 112.

With respect to the query 138 (i.e., the further query), the response generation module 144 is to generate, based on the query 138 and the dependency tree 120, the response 146 to include the update that includes a modification to an application metadata fragment and/or an application metadata fragment dependency of the application metadata 126. As disclosed herein, the dependency tree 120 may include a parent to child relationship between each of a plurality of metadata fragments 106 including an application metadata fragment that corresponds to the application metadata fragment, and may further include metadata fragment versions 108 associated with the plurality of metadata fragments 106.

With respect to the query 138 that includes the previous version 140 associated with the previous synchronization of the application metadata 126, the response generation module 144 may identify, starting from a leaf metadata fragment selected from the metadata fragments 106, a metadata fragment that includes a newer version compared to the previous version 140. The response generation module 144 may identify, from the dependency tree 120, a subtree below the metadata fragment that includes the newer version. Alternatively, the response generation module 144 may identify, starting from a root of the dependency tree 120, a node with a newer version, and a subtree below the node with the newer version. Further, the response generation module 144 may generate the response 146 to include the metadata fragment that includes the newer version and the subtree.

Additionally or alternatively, with respect to the query 138 that includes the previous version 140 associated with the previous synchronization of the application metadata 126, the response generation module 144 may identify, starting from a leaf (or from a root of the dependency tree 120 as disclosed herein) metadata fragment selected from the metadata fragments 106, an edge (i.e., a link associated with a metadata fragment dependency) of the dependency tree 120 that includes a newer version compared to the previous version 140. The response generation module 144 may identify, from the dependency tree 120, a subtree below the edge that includes the newer version. Further, the response generation module 144 may generate the response 146 to include the edge and the subtree.

With respect to the query 138 that includes the application metadata tree 142 (e.g., an application metadata forest for a query that includes a plurality of application metadata trees) associated with the application metadata 126, the response generation module 144 may identify, starting from a leaf metadata fragment selected from the metadata fragments 106, a metadata fragment that includes a newer version compared to a version of a corresponding metadata fragment of the application metadata tree 142. Further, the response generation module 144 may generate the response 146 to include the metadata fragment that includes the newer version.

Additionally or alternatively, with respect to the query 138 that includes the application metadata tree 142 (e.g., an application metadata forest) associated with the application metadata 126, the response generation module 144 may identify, starting from a leaf metadata fragment selected from the metadata fragments 106, an edge (i.e., a link associated with a metadata fragment dependency) of the dependency tree 120 that includes a newer version compared to a version of a corresponding edge of the application metadata tree 142 associated with the query 138. Further, the response generation module 144 may generate the response 146 to include the edge that includes the newer version. Compared to the query 138 that includes the previous version 140 associated with the previous synchronization of the application metadata 126, for the query 138 that includes the application metadata tree 142 (e.g., an application metadata forest for a query that includes a plurality of application metadata trees) associated with the application metadata 126, network traffic may be minimized based on filtering to remove certain dependencies, and the return of the response 146 to include information on those metadata fragments that are newer than the metadata fragments specified in the application metadata tree 142.

The response 146 may be used to modify the application metadata 126 associated with the application 130. For example, the client device that operates the application 130 may modify the application metadata 126 associated with the application 130.

The elements of the apparatus 100 are described in further detail with reference to FIGS. 1-11.

Referring to FIG. 1, as disclosed herein, the metadata analysis module 102 is to analyze the metadata 104 to extract the metadata fragments 106 from the metadata 104. For example, assuming that the metadata 104 includes metadata fragments 106 as "forms", "views", "entities", "attributes", "controls", and "labels", the metadata format may be such that "form" and "view" metadata fragments include layout XML that references "controls", "attribute" metadata fragments point to their parent entity metadata fragments, and "controls" metadata fragments reference "labels" in their configuration XML documents. In this regard, parsing of the layout XML (e.g., for the "form" and "view" metadata fragments) by a client that implements the application 130 is not needed as the query analysis module 122 may query the dependency table 116 that is determined from parsing the layout XML for "form" and "view". In this example, the dependency table 116 may indicate that "form" and "view" metadata fragments depend on "controls", which depend on "labels", etc. As part of generation of the dependency tree 120, the metadata analysis module 102 may analyze each metadata fragment to extract a parent-to-child relationship, and store these relationships in the dependency table 116.

As disclosed herein, the query analysis module 122 is to receive the query 138 for an update of application metadata 126 associated with the application 130. In this regard, the response generation module 144 may query the dependency table 116 for a particular metadata fragment of the application metadata 126 that is requested in the query 138. The application metadata fragment may be designated as a parent metadata fragment. The response generation module 144 may retrieve dependencies with respect to the application metadata fragment from the dependency table 116. For the example of the metadata fragments 106 including "forms", "views", "entities", "attributes", "controls", and "labels", the query 138 may include a request to retrieve metadata for a specific "form". The response generation module 144 may select the root metadata fragment (e.g., "form"), but instead of parsing the layout XML of the metadata fragment "form" and extracting IDs of child "controls" (and potentially extracting an associated repository name), the response generation module 144 may query the dependency table 116 to retrieve all of the children "controls". Similarly, for each "controls" metadata fragment that references "labels" in its configuration XML document, the response generation module 144 may query the dependency table 116 to ascertain all of the child label IDs (without the need to parse the configuration XML for "label" IDs).

As disclosed herein, the query 138 (i.e., the further query) may represent a query for incremental metadata retrieval. With respect to incremental metadata retrieval, as disclosed herein, the dependency tree 120 may include metadata fragment versions 108 and metadata fragment dependency versions 112. The metadata fragment versions 108 and the metadata fragment dependency versions 112, which are previously specified, may be included in the dependency tree 120 when the dependency tree 120 is generated, and modified when the dependency tree 120 is modified. The metadata fragment versions 108 may be created and/or updated when the root metadata fragment of the dependency tree 120 is created and/or updated (e.g., during initial setup and/or customization). Further, the metadata fragment dependency versions 112 may be created and/or updated when the root metadata fragment of the dependency tree 120 is created and/or updated (e.g., during initial setup and/or customization).

As disclosed herein, the query 138 for incremental metadata retrieval may include a first option where the query 138 includes the previous version 140 associated with a previous synchronization of the application metadata 126. The query 138 for incremental metadata retrieval may include a second option where the query 138 includes the application metadata tree 142 (e.g., an application metadata forest for a query that includes a plurality of application metadata trees) associated with the application metadata 126.

For the query 138 including the previous version 140 associated with a previous synchronization of the application metadata 126, the response generation module 144 is to identify all metadata fragments 106 associated with the query 138. The query 138 may include a single version (i.e., the previous version 140), which represents an oldest version associated with a metadata fragment from all of the application metadata fragments 128. For example, assuming that the query 138 includes metadata headers for the application metadata fragments 128 "forms", "views", "entities", "attributes", "controls", and "labels", assuming that "label" metadata fragment is the latest updated metadata fragment, and the other metadata fragments have not been updated since initial retrieval, in this case, the query 138 may be assigned the version associated with the "label" metadata fragment.

For the query 138 including the previous version 140 associated with the previous synchronization of the application metadata 126, the response generation module 144 may prune the dependency tree 120 by traversing the dependency tree 120 starting at the leaves (i.e., outermost nodes) of the dependency tree 120, moving up level by level until the node or edge with a newer version is met. If the version of a leaf is older than the previous version 140, the leaf may be pruned. If a version of the leaf is newer then the previous version 140, then the leaf may be preserved. The response generation module 144 may identify a full subtree below the found leaf of the dependency tree 120. In this regard, the full subtree may represent the part of the dependency tree 120 that is associated with the newer version metadata fragment of the dependency tree 120. Further, the resulting payload may be represented by a forest of subtrees. Alternatively, as disclosed herein, for the query 138 including the previous version 140 associated with the previous synchronization of the application metadata 126, the response generation module 144 may identify, starting from a root of the dependency tree 120, a node with a newer version, and a subtree below the node with the newer version.

For the query 138 including the application metadata tree 142 (or an application metadata header tree as disclosed herein) associated with the application metadata 126, the query 138 may also include all versions associated with the application metadata tree 142. In this regard, a client that implements the application 130 may be aware of the metadata fragments 106 of the dependency tree 120, but some dependencies may be new and not known to the client. In this regard, the response generation module 144 may perform a deeper analysis and implement greater pruning of the dependency tree 120 compared to the query 138 including the previous version 140 associated with a previous synchronization of the application metadata 126. For example, if the query 138 including the previous version 140 associated with a previous synchronization of the application metadata 126 results in identification of the metadata fragment "form" which includes a newer version compared to the previous version 140, then the full subtree for the "form" metadata fragment may be included in the response 146. If the query 138 instead includes the application metadata tree 142, there may be dependencies under the new "form" metadata fragment that are included in the application metadata tree 142. The response generation module 144 may filter (i.e., remove) such dependencies, and return the response 146 to include information on those metadata fragments that are newer than the metadata fragments specified in the application metadata tree 142.

Figure 2:
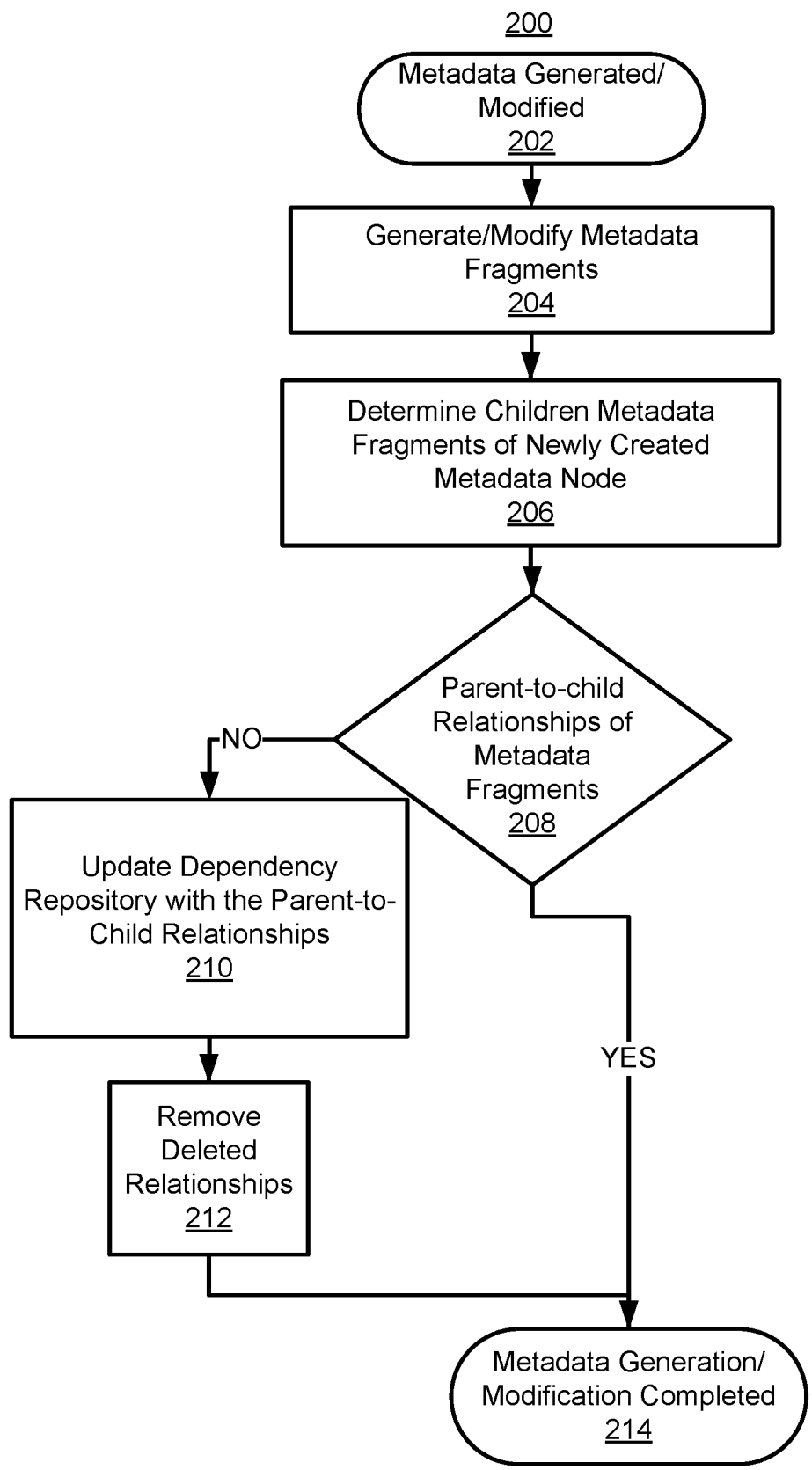
FIG. 2 illustrates a flowchart for metadata generation and modification for the apparatus of FIG. 1 in accordance with an embodiment of the present disclosure.

FIG. 2 illustrates a flowchart 200 for metadata generation and modification for the apparatus 100 in accordance with an embodiment of the present disclosure.

Referring to FIGS. 1 and 2, at block 202, metadata generation and modification may begin with a determination, by the metadata analysis module 102, that the metadata 104 has not been generated or modified.

At block 204, the metadata analysis module 102 is to use existing capabilities (e.g., of a server) to generate and/or modify metadata fragments 106. The metadata fragment versions 108 may also be updated during generation and/or modification of the metadata fragments 106. In this regard, the metadata analysis module 102 may analyze the metadata 104 to generate and/or modify metadata fragments 106 as disclosed herein with respect to FIG. 3.

At block 206, the metadata analysis module 102 is to determine children metadata fragments of a newly created metadata node of the dependency tree 120 (e.g., as disclosed herein with respect to FIGS. 3-6B).

At block 208, a determination may be made as to whether a dependency repository 148 (which may include the dependency table 116, and further dependency information with respect to the metadata 104) includes a parent-to-child relationship of the newly created metadata node of the dependency tree 120.

In response to a determination that the dependency repository 148 does not include the parent-to-child relationship of the newly created metadata node of the dependency tree 120, at block 210, the dependency repository 148 may be updated to include the parent-to-child relationship of the newly created metadata node of the dependency tree 120. In this regard, any pre-existing parent-to-child relationships may be updated to include the newly created metadata node of the dependency tree 120.

At block 212, any existing parent-to-child relationships that have been deleted based on the parent-to-child relationship of the newly created metadata node of the dependency tree 120 may be removed. Thus, any parent-to-child relationships that no longer exist may be removed from the dependency tree 120.

In response to a determination that the dependency repository 148 includes the parent-to-child relationship of the newly created metadata node of the dependency tree 120, at block 214, metadata generation and modification may be completed.

Figure 3:
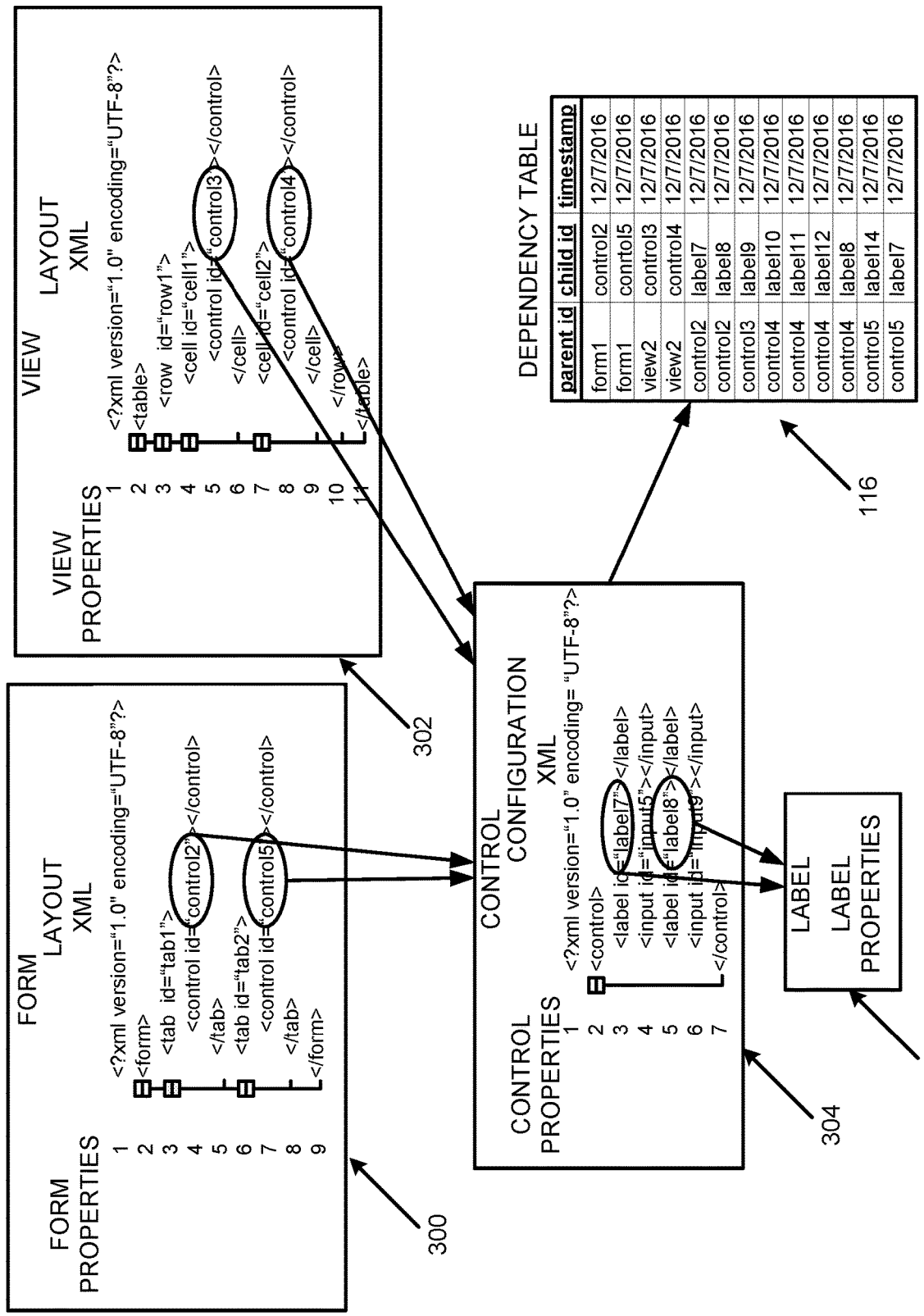
FIG. 3 illustrates generation of a dependency table for the apparatus of FIG. 1 in accordance with an embodiment of the present disclosure.

FIG. 3 illustrates generation of a dependency table 116 for the apparatus 100 in accordance with an embodiment of the present disclosure.

Referring to FIGS. 1 and 3, in order to generate the dependency table 116 from the metadata 104 that includes "form", "view", "control", and "label", respectively identified at 300, 302, 304, and 306, the dependency table generation module 114 is to identify a parent-to-child relationship of each of the metadata fragments 106. For example, the dependency table 116 may include a metadata fragment including a parent identification (ID) "form1" that includes a child ID "control2", another metadata fragment including a parent ID "form1" that includes a child ID "control4", etc. These parent-to-child relationships may be used to generate the dependency table 116. For the example of FIG. 3, the dependency table 116 may include a timestamp (instead of a version) associated with generation of each entry.

FIG. 4 illustrates a modification of the dependency table 116 of FIG. 3 in accordance with an embodiment of the present disclosure.

Referring to FIGS. 1, 3, and 4, the dependency table 116 may be modified from the table shown in FIG. 3 (illustrated as 400 in FIG. 4) to the table shown at 402. The dependency table 116 shown at 402 may include the further dependencies at 404 (e.g., a parent ID "form1" that includes a child ID "control6", a parent ID "form1" that includes a child ID "control3", and a parent ID "control6" that includes a child ID "label5").

Figure 5:
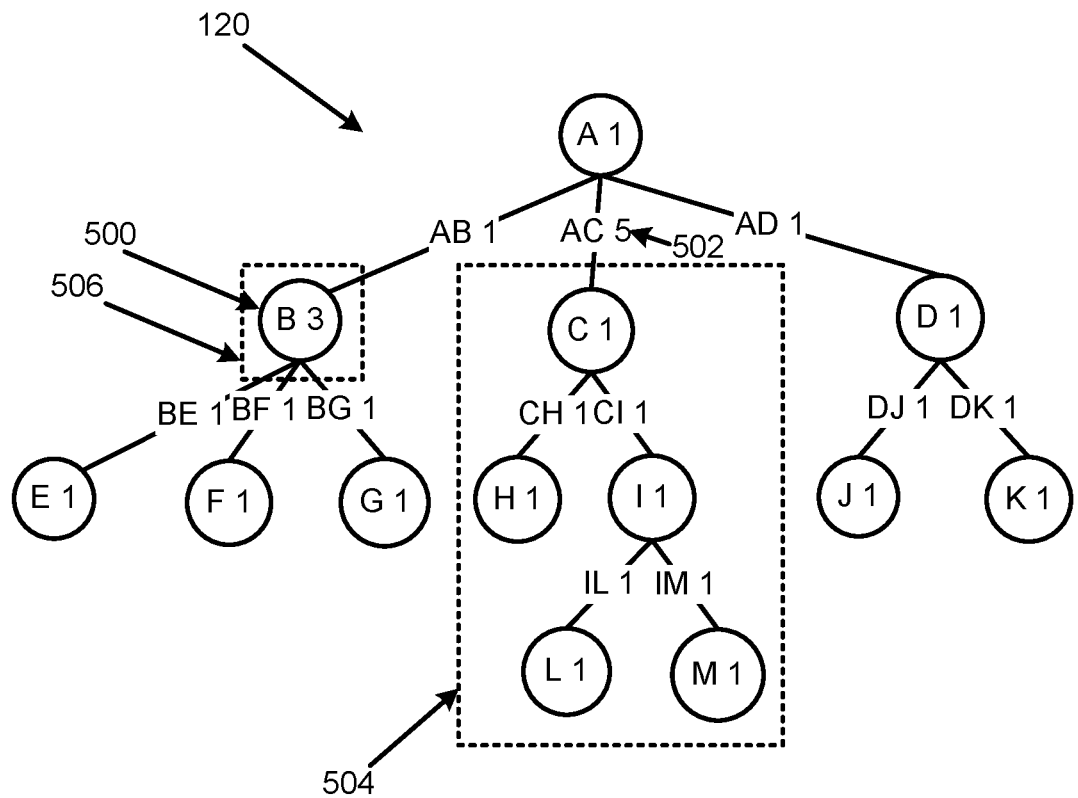
FIG. 5 illustrates an incremental metadata update based on a query that includes a previous version associated with a previous synchronization of application metadata in accordance with an embodiment of the present disclosure.

FIG. 5 illustrates an incremental metadata update based on the query 138 that includes the previous version 140 associated with a previous synchronization of the application metadata 126 in accordance with an embodiment of the present disclosure.

Referring to FIGS. 1 and 5, the dependency tree generation module 118 is to generate the dependency tree 120 based on the dependency table 116. For example, the dependency tree 120 may be generated to include a root (e.g., "form1" in the example of FIG. 4, and illustrated as "A1" in the example of FIG. 5), and metadata fragment dependencies 110 that identify dependencies between the root and the metadata fragments 106. In the example of FIG. 4, a metadata fragment may be illustrated as a circle, and a metadata fragment dependency may be illustrated as a line that connects the metadata fragments 106. The outer metadata fragments may be designated as leaves. For the dependency tree 120 of FIG. 5, for the designation ("XN"), the letter "X" on each the metadata fragment may represent a unique identifier of the metadata fragment, and the number "N" may represent the metadata fragment version. In this regard, the greater the number "N", the newer the metadata fragment version.

With respect to metadata fragment dependency of the dependency tree 120, for the designation ("YZM"), the letter "Y" on each metadata fragment dependency may represent a unique identifier of the parent metadata fragment, the letter "Z" may represent a unique identifier of the child metadata fragment, and the number "M" may represent a metadata fragment dependency version. In this regard, the greater the number "M", the newer the metadata fragment dependency. The marked metadata fragment "B3" and the metadata fragment dependency "AC5", respectively, at 500 and 502 may represent a metadata fragment and a metadata fragment dependency that have been updated since the last metadata synchronization. Further, the dashed boxes at 504 and 506 may represent the part of the dependency tree 120 that will be returned in response to the query 138.

For the example of FIG. 5, the query analysis module 122 is to receive the query 138 for an incremental update of the application metadata 126. The query 138 may include the previous version 140 (e.g., in this case a version of "2") associated with a previous synchronization of the application metadata 126.

The response generation module 144 is to generate, based on the query 138 and the dependency tree 120 (e.g., the dependency tree of FIG. 5), the response 146 to include the incremental update that includes a modification to an application metadata fragment (or no application metadata fragment) of the application metadata 126. For example, the response generation module 144 may compare the version of "2" with the metadata fragment versions 108 of each of the metadata fragments 106 of the dependency tree 120. In this regard, the response generation module 144 may identify, starting from a leaf metadata fragment selected from the metadata fragments 106 of the dependency tree of FIG. 5, a metadata fragment which includes a newer version (or timestamp) compared to the previous version (or timestamp). For the example of FIG. 5, based on the comparison, the response generation module 144 may determine that the metadata fragment "B3" and the metadata fragment dependency "AC5" include newer versions compared to the version of "2" associated with the query 138. Further, the response generation module 144 may identify, from the dependency tree 120, a subtree below the metadata fragment which includes the newer version (or timestamp). For example, the response generation module 144 may identify the subtree shown at 504 below the metadata fragment dependency "AC5". Similarly, the response generation module 144 may identify the subtree shown at 506 at the metadata fragment "B3". Further, the response generation module 144 may generate the response 146 to include the metadata fragment and the metadata fragment dependency (e.g., "B3" and "AC5") which include the newer version and the associated subtrees.

Figure 6A:
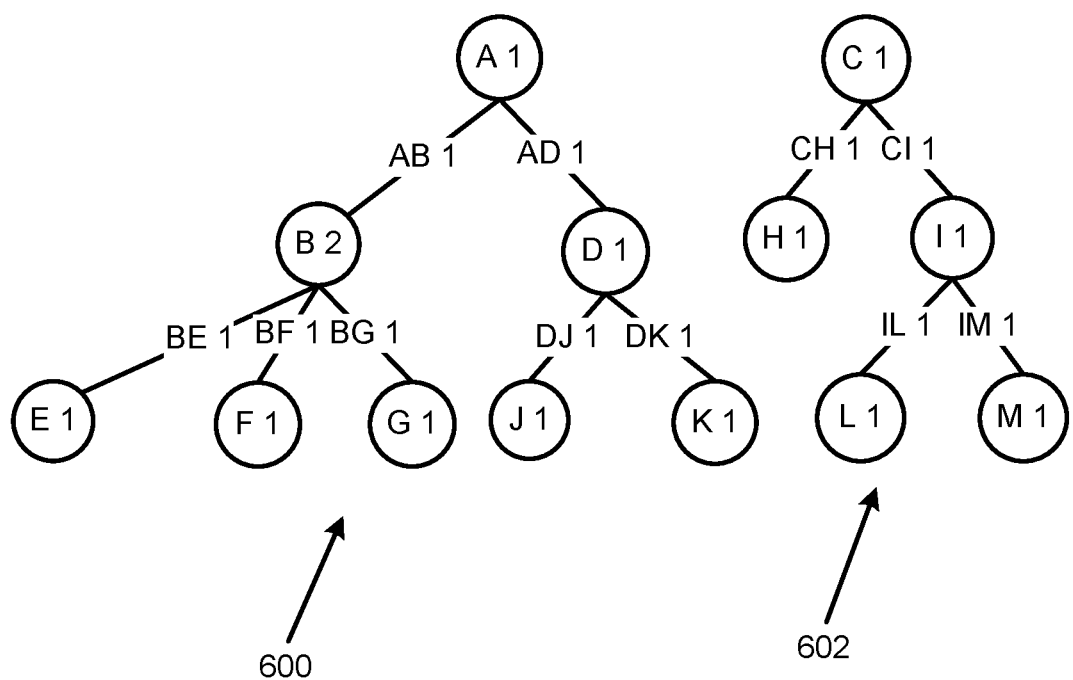
FIGS. 6A and 6B illustrate an incremental metadata update based on a query that includes an application metadata tree associated with the application metadata in accordance with an embodiment of the present disclosure.
Figure 6B:
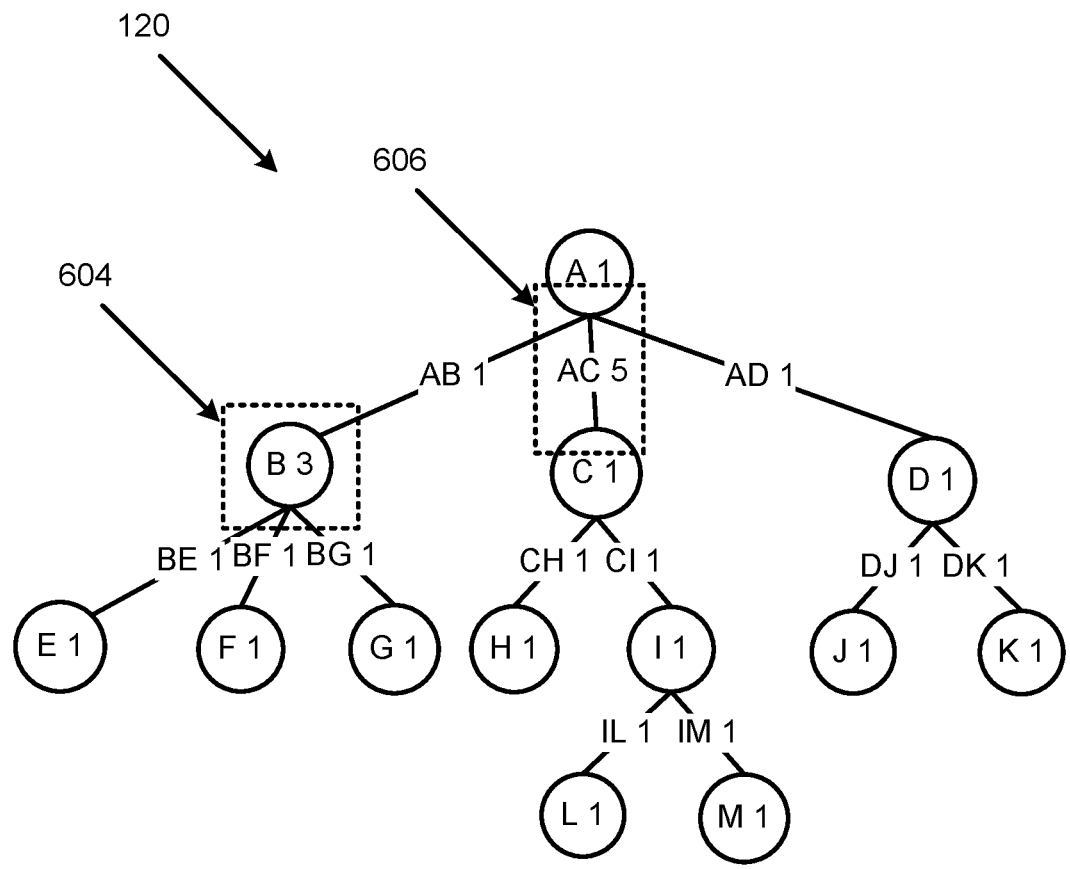

FIGS. 6A and 6B, collectively, illustrate an incremental metadata update based on the query 138 that includes the application metadata tree 142 associated with the application metadata 126 in accordance with an embodiment of the present disclosure.

Referring to FIGS. 1 and 6A, the query analysis module 122 is to receive the query 138 for an update of the application metadata 126. The query 138 may include the application metadata tree 142 associated with the application metadata 126. For example, as shown in FIG. 6A, the query 138 may include application metadata trees 600 and 602 associated with the application metadata 126.

Referring to FIGS. 1 and 6B, the response generation module 144 is to generate, based on the query 138 and the dependency tree 120 (e.g., the dependency tree of FIG. 6B), the response 146 to include the update that includes a modification to an application metadata fragment and/or an application metadata fragment dependency of the application metadata 126. For example, the response generation module 144 may compare each version of the metadata trees 600 and 602 associated with the application metadata 126 with the dependency tree of FIG. 6B. In this regard, the response generation module 144 may identify the metadata fragment "B3" and the metadata fragment dependency "AC5" to include a newer version (or timestamp). Further, the response generation module 144 may generate the response 146 to include the metadata fragment (e.g., "B3" identified at 604) and the metadata fragment dependency (e.g., "AC5" identified at 606) which include the newer version.

Thus, compared to the example of FIG. 5 where the response generation module 144 may generate the response 146 to include the metadata fragment and the metadata fragment dependency (e.g., "B3" and "AC5") which include the newer version and the associated subtrees, for FIGS. 6A and 6B, the response generation module 144 may generate the response 146 to include the metadata fragment (e.g., "B3" identified at 604) and the metadata fragment dependency (e.g., "AC5" identified at 606) which include the newer version.

Figure 7:
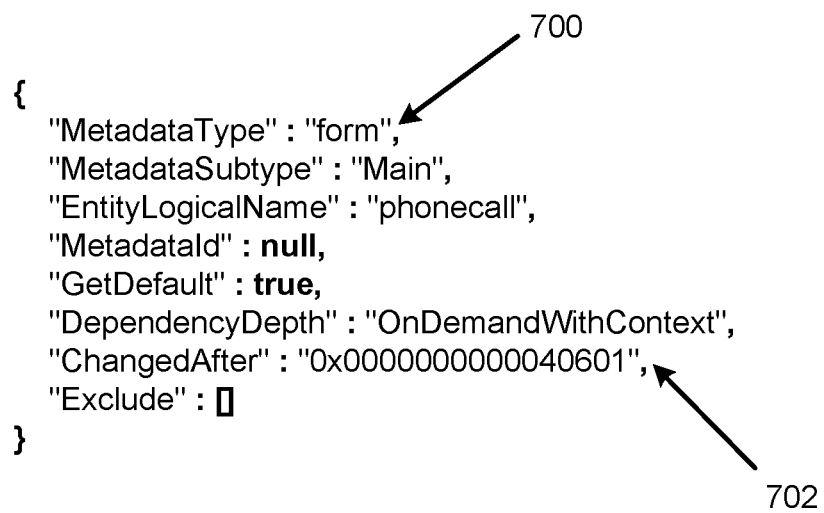
FIG. 7 illustrates a metadata retrieval for a "form" metadata fragment in accordance with an embodiment of the present disclosure.

FIG. 7 illustrates a metadata retrieval for a "form" metadata fragment in accordance with an embodiment of the present disclosure.

Referring to FIGS. 1 and 7, according to another example, the query analysis module 122 is to receive the query 138 for an update of the application metadata 126 (e.g., "form", as shown at 700) associated with the application 130.

The query 138 may include the previous version 140 (e.g., "0x0000000000040601", as shown at 702) associated with a previous synchronization of the application metadata 126. For the example of FIG. 7, the metadata 104 for a "form" may represent an instance of a phone call.

Figure 8:
FIG. 8 illustrates a list of metadata fragments generated from the "form" metadata fragment of FIG. 7 in accordance with an embodiment of the present disclosure.

FIG. 8 illustrates a list of metadata fragments generated from the "form" metadata fragment of FIG. 7 in accordance with an embodiment of the present disclosure.

Referring to FIGS. 1, 7, and 8, and particularly FIG. 8, the response generation module 144 is to analyze the dependency tree 120 to identify root nodes including the metadata "form". Based on the identified root nodes including the metadata "form", the response generation module 144 may identify all of the dependency children, grand-children, etc., of the root nodes including the metadata "form". Examples of children, grand-children, etc., of the root nodes including the metadata "form" are illustrated at 800 in FIG. 8.

The response generation module 144 may apply a dependency depth parameter 150 and collect the table name, the ID, and the version number of all the dependency records that may potentially be included in the resulting payload of the response 146. The dependency depth parameter 150 may represent a filtering parameter that is used to filter metadata fragments that are retrieved from the dependency table 116. For example, a dependency depth parameter 150 may specify that the dependency depth is to be limited to children, in which case any grand-children, great grand-children etc., may be filtered from the dependency records that may potentially be included in the resulting payload of the response 146. The dependency depth parameter 150 may also specify different dependencies for different types of metadata fragments (e.g., different dependencies for "forms", versus "controls", etc.). Yet further, the dependency depth parameter 150 may also specify filtering based on different versions (or timestamps). For example, metadata fragments older than a particular version may be removed from the response 146. The dependency depth may not need to be limited by a single node selection or tree slicing criteria. In this regard, the dependency depth may be a combination of all of the above and/or a set of server-side heuristics and/or a set of client side conditions.

Figure 9:
FIG. 9 illustrates a filtering of the list of metadata fragments of FIG. 8 in accordance with an embodiment of the present disclosure.

FIG. 9 illustrates a filtering of the list of metadata fragments of FIG. 8 in accordance with an embodiment of the present disclosure.

Referring to FIGS. 1 and 7-9, and particularly FIG. 9, assuming that the dependency depth parameter 150 is specified as version "0x0000000000040601" associated with the "form" metadata fragment of FIG. 7, then metadata fragments including versions prior to this version number may be filtered. For example, as shown at 900, the metadata fragments including versions prior to the version "0x0000000000040601" are crossed out as being filtered.

FIG. 10 illustrates a response that is generated for metadata retrieval for the "form" metadata fragment of FIG. 7 in accordance with an embodiment of the present disclosure.

Referring to FIGS. 1 and 7-10, and particularly FIG. 10, the response generation module 144 is to generate the response 146 to include a set of metadata fragments 106. In this regard, the response generation module 144 may query an information table (or a plurality of information tables) with respect to the metadata fragments included in the response to determine any further information with respect to the metadata fragments. The information table may include detailed information with respect to the metadata 104, such as tab attributes, added-by information, etc., as shown at 1000 for the "form" metadata fragment. For example, compared to FIG. 9 which shows limited details on the metadata fragments 106, the metadata fragments 106 included in the response 146 may include further details that may be needed for use of the metadata fragments 106 by the application 130.

Figure 11:
FIG. 11 illustrates a modification of a version assigned to the "form" metadata fragment in accordance with an embodiment of the present disclosure.

FIG. 11 illustrates a modification of a version assigned to the "form" metadata fragment in accordance with an embodiment of the present disclosure.

Referring to FIGS. 1, 10, and 11, the highest version associated with the response 146 may be used to update the current version of the application metadata 126. For example, referring to FIG. 10 which a shows a version of "0x0000000000051218" for metadata fragment "labels" at 1002, as shown at 1100 in FIG. 11, the version number "0x0000000000051218" may be used to update the version of the metadata fragment "form" associated with the application 130.

Figure 12:
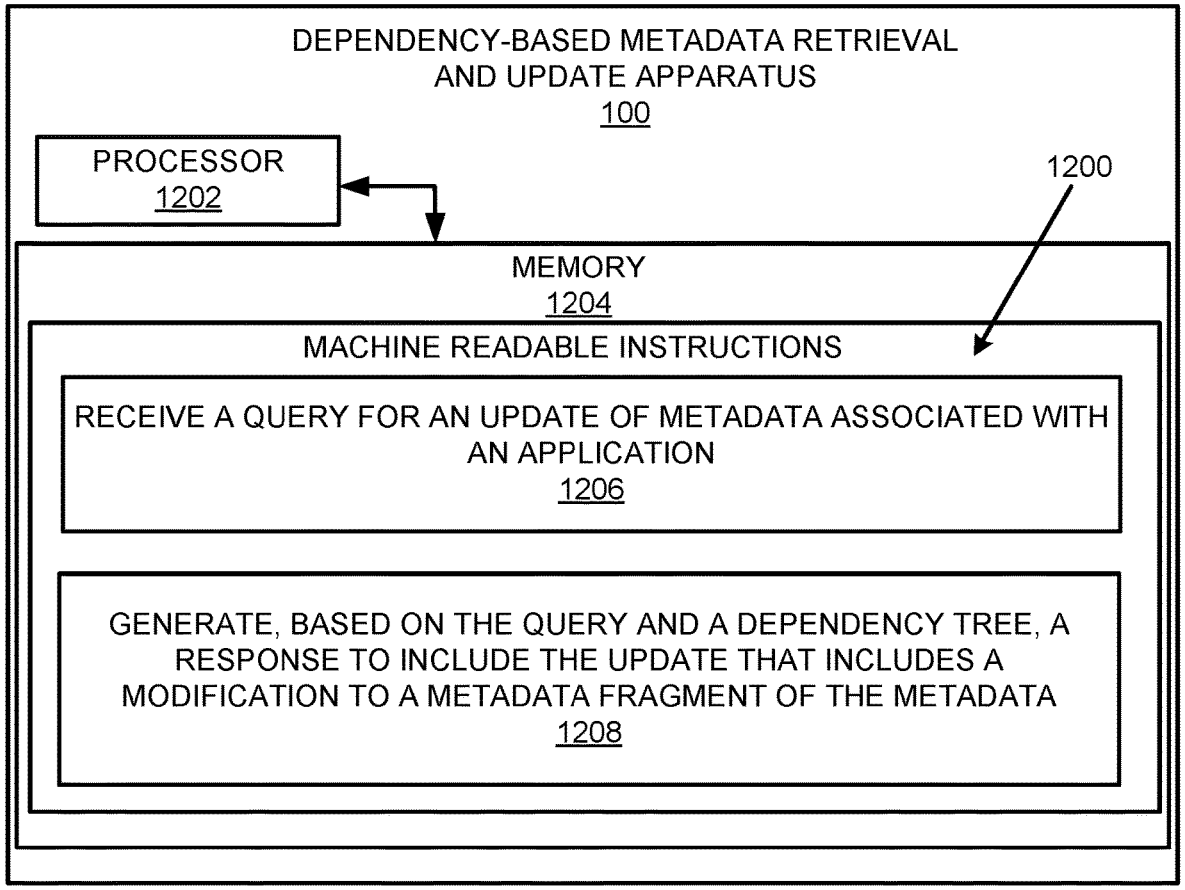
FIG. 12 illustrates a block diagram for dependency-based metadata retrieval and update in accordance with an embodiment of the present disclosure.
Figure 13:
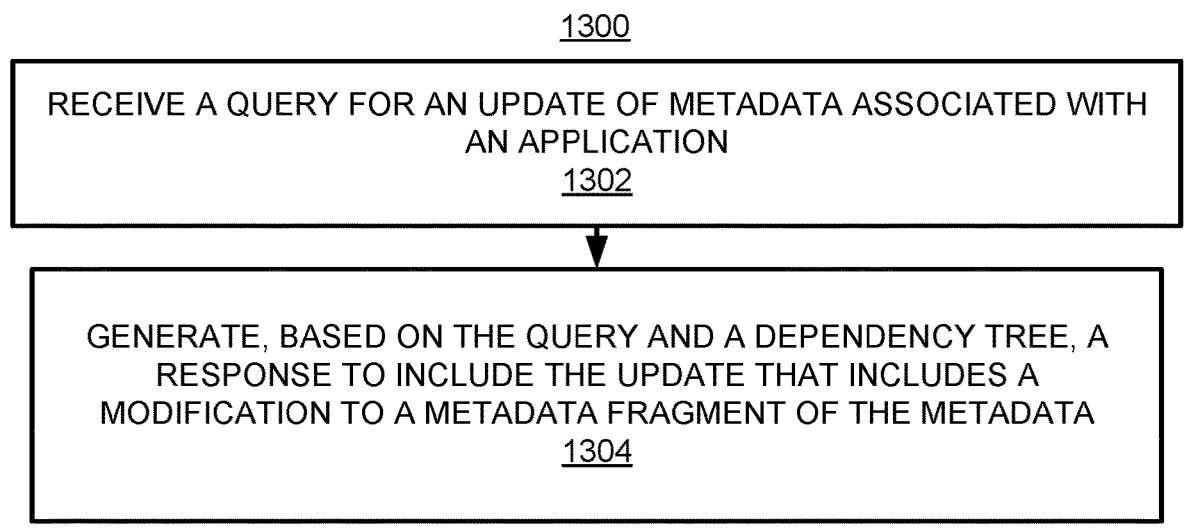
FIG. 13 illustrates a flowchart of a method for dependency-based metadata retrieval and update in accordance with an embodiment of the present disclosure.
Figure 14:
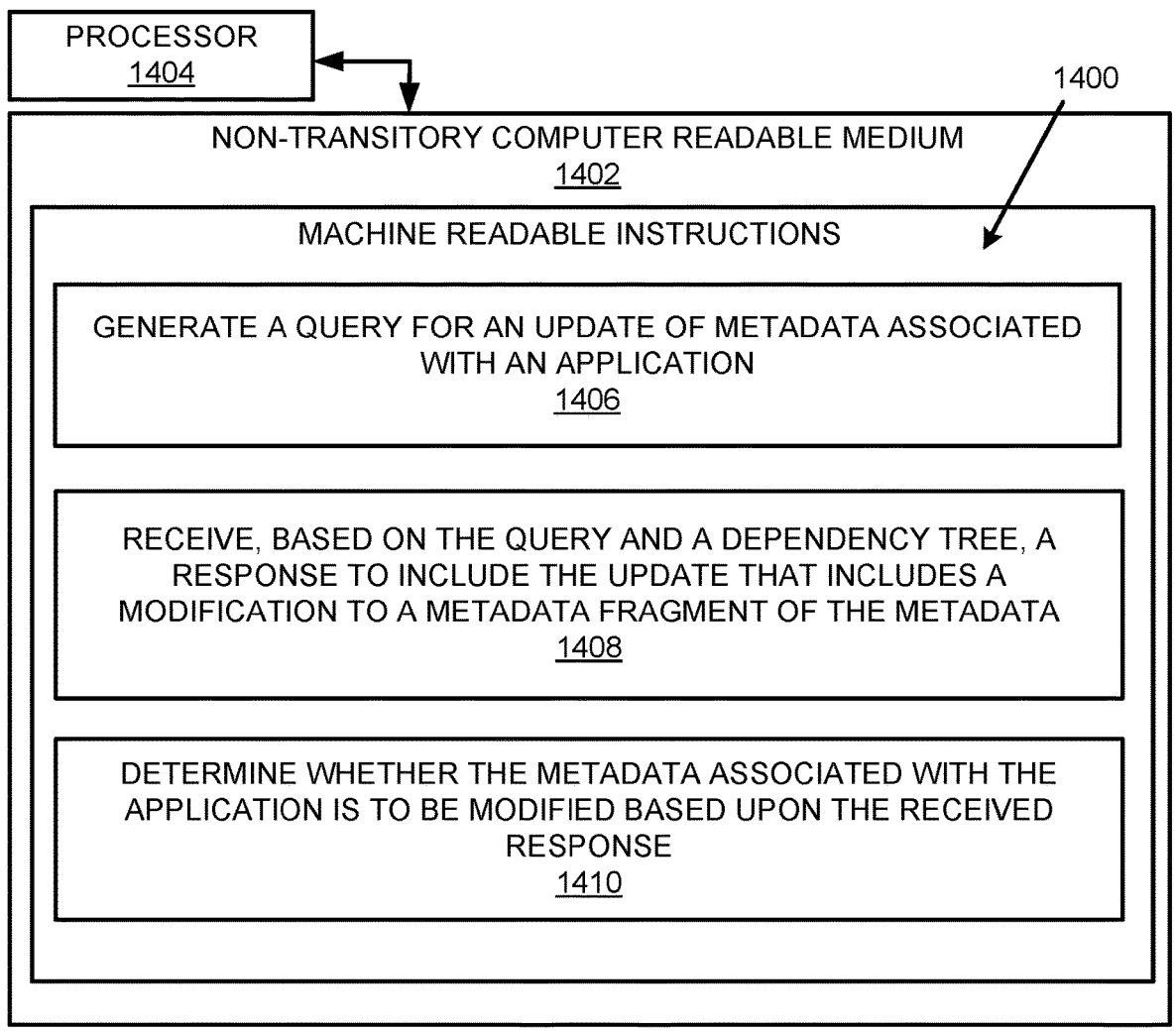
FIG. 14 illustrates a block diagram for dependency-based metadata retrieval and update in accordance with an embodiment of the present disclosure.

FIGS. 12-14 respectively illustrate a block diagram 1200, a flowchart of a method 1300, and a further block diagram 1400 for dependency-based metadata retrieval and update, in accordance with embodiments of the present disclosure. The block diagram 1200 and the method 1300 may be implemented on the apparatus 100 described above with reference to FIG. 1 by way of example and not limitation. The block diagram 1200, the method 1300, and the block diagram 1400 may be practiced in other apparatus. For example, the block diagram 1400 may be implemented on a client that implements the application 130. In addition to showing the block diagram 1200, FIG. 12 shows hardware of the apparatus 100 that may execute the instructions of the block diagram 1200. The hardware may include a processor 1202, and a memory 1204 storing machine readable instructions that when executed by the processor cause the processor to perform the instructions of the block diagram 1200. The memory 1204 may represent a non-transitory computer readable medium. FIG. 13 may represent a method for dependency-based metadata retrieval and update, and the steps of the method. FIG. 14 may represent a non-transitory computer readable medium 1402 having stored thereon machine readable instructions to provide dependency-based metadata retrieval and update. The machine readable instructions, when executed, cause a processor 1404 to perform the instructions of the block diagram 1400 also shown in FIG. 14.

The processor 1202 of FIG. 12 and/or the processor 1404 of FIG. 14 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1402 of FIG. 14), such as hardware storage devices (e.g., RAM (random access memory), ROM (read only memory), EPROM (erasable, programmable ROM), EEPROM (electrically erasable, programmable ROM), hard drives, and flash memory). The memory 1204 may include a RAM, where the machine readable instructions and data for a processor may reside during runtime.

Referring to FIGS. 1 and 12, and particularly to the block diagram 1200 shown in FIG. 12, at block 1206, the memory 1204 may include instructions to receive (e.g., by the query analysis module 122) the query 138 for an update of metadata (e.g., the application metadata 126) associated with the application 130. The query 138 may include the previous version 140 associated with a previous synchronization of the metadata (e.g., the application metadata 126).

The processor 1202 may fetch, decode, and execute the instructions 1208 to generate (e.g., by the response generation module 144), based on the query 138 and the dependency tree 120, the response 146 to include the update that includes a modification to a metadata fragment (e.g., an application metadata fragment) of the metadata (e.g., the application metadata 126). The dependency tree 120 may include a parent and child relationship between each of a plurality of metadata fragments (e.g., where the metadata fragments 106 are to correspond to the application metadata fragments 128) including the metadata fragment, and may further include versions (e.g., where the metadata fragment versions 108 are to correspond to the application metadata fragment versions 132) associated with the plurality of metadata fragments. According to an example, the response 146 may be used (e.g., by a client that implements the application 130) to modify the metadata (e.g., the application metadata 126) associated with the application 130.

Referring to FIGS. 1 and 13, and particularly FIG. 13, for the method 1300, at block 1302, the method may include receiving (e.g., by the query analysis module 122) the query 138 for an update of metadata (e.g., the application metadata 126) associated with the application 130. The query 138 may include a metadata tree (e.g., an application metadata tree 142) associated with the metadata (e.g., the application metadata 126).

At block 1304, the method may include generating (e.g., by the response generation module 144), based on the query 138 and the dependency tree 120, the response 146 to include the update that includes a modification to a metadata fragment (e.g., an application metadata fragment) of the metadata (e.g., the application metadata 126).

Referring to FIGS. 1 and 14, and particularly FIG. 14, for the block diagram 1400, at block 1406, the non-transitory computer readable medium 1402 may include instructions to generate (e.g., by a client that implements the application 130) a query for an update of metadata (e.g., the application metadata 126) associated with the application 130. The query may include the previous version 140 associated with a previous synchronization of the metadata (e.g., the application metadata 126), and/or a metadata tree (e.g., an application metadata tree 142) associated with the metadata (e.g., the application metadata 126).

The processor 1404 may fetch, decode, and execute the instructions 1408 to receive, based on the query and the dependency tree 120, the response 146 to include the update that includes a modification to a metadata fragment (e.g., an application metadata fragment) of the metadata (e.g., the application metadata 126).

The processor 1404 may fetch, decode, and execute the instructions 1410 to determine (e.g., by the client that implements the application 130) whether the metadata (e.g., the application metadata 126) associated with the application 130 is to be modified based upon the received response 146.

What has been described and illustrated herein are embodiments along with some of their variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a memory storing machine readable instructions that when executed by the processor cause the processor to:
      receive a query for an update of metadata associated with an application, wherein the query includes a previous version associated with a previous synchronization of the metadata, and further includes a metadata tree associated with the metadata; and
      generate, based on the query and a dependency tree, a response to include the update that includes a modification to a metadata fragment of the metadata by:
         identifying, with respect to the metadata tree, starting from a leaf metadata fragment selected from a plurality of metadata fragments, an edge of the dependency tree that includes a newer version compared to a version of a corresponding edge of the metadata tree; and
         generating the response to include the edge that includes the newer version, wherein the dependency tree includes
            a parent and child relationship between each of the plurality of metadata fragments including the metadata fragment, and
            further includes versions associated with the plurality of metadata fragments.

2. The apparatus according to claim 1, wherein the instructions are further to cause the processor to:
   receive, prior to receiving the query for the update, an initial query to retrieve the metadata and dependencies associated with the plurality of metadata fragments of the metadata; and
   forward, based on the initial query and at least on the dependency tree, the metadata and the dependencies associated with the plurality of metadata fragments of the metadata.

3. The apparatus according to claim 1, wherein the previous version includes at least one of:
   a version number that is modified based on an update associated with the metadata fragment in the dependency tree; or
   a timestamp associated with creation or modification of the metadata fragment in the dependency tree.

4. The apparatus according to claim 1, wherein the instructions are further to cause the processor to:
   identify, starting from the leaf metadata fragment selected from the plurality of metadata fragments, a metadata fragment which includes another newer version compared to the previous version;
   identify, from the dependency tree, a subtree below the metadata fragment which includes the other newer version; and
   generate the response to include the metadata fragment which includes the other newer version and the subtree.

5. The apparatus according to claim 1, wherein the instructions are further to cause the processor to:
   identify, starting from the leaf metadata fragment selected from the plurality of metadata fragments, the edge of the dependency tree that includes the newer version compared to the previous version;
   identify, from the dependency tree, a subtree below the edge that includes the newer version; and
   generate the response to include the edge and the subtree.

6. The apparatus according to claim 1, wherein the query includes at least two metadata fragments from the plurality of metadata fragments, and the previous version represents an oldest version associated with a metadata fragment from the at least two metadata fragments.

7. The apparatus according to claim 1, wherein the instructions are further to cause the processor to:
   receive another query for another update of the metadata associated with the application, wherein the another query includes the metadata tree associated with the metadata; and
   generate, based on the another query and the dependency tree, another response to include the another update that includes another modification to the metadata fragment of the metadata.

8. The apparatus according to claim 7, wherein the instructions are further to cause the processor to:
   identify, with respect to the metadata tree associated with the another query, starting from the leaf metadata fragment selected from the plurality of metadata fragments, a metadata fragment that includes another newer version compared to a version of a corresponding metadata fragment of the metadata tree associated with the another query; and
   generate the another response to include the metadata fragment that includes the other newer version.

9. The apparatus according to claim 7, wherein the instructions are further to cause the processor to:
   identify, with respect to the metadata tree associated with the another query, starting from the leaf metadata fragment selected from the plurality of metadata fragments, the edge of the dependency tree that includes the newer version compared to the version of the corresponding edge of the metadata tree associated with the another query; and
   generate the another response to include the edge that includes the newer version.

10. A method comprising:
    receiving a query for an update of metadata associated with an application, wherein the query includes a metadata tree associated with the metadata;
    generating, by a processor and based on the query and a dependency tree, a response to include the update that includes a modification to a metadata fragment of the metadata, wherein the dependency tree includes a parent and child relationship between each of a plurality of metadata fragments including the metadata fragment, and further includes versions associated with the plurality of metadata fragments;

receiving another query for another update of the metadata associated with the application, wherein the another query includes a previous version associated with a previous synchronization of the metadata; and generating, based on the another query and the dependency tree, another response to include the another update that includes another modification to the metadata fragment of the metadata.

11. The method of claim 10, further comprising:

identifying, with respect to the metadata tree, starting from a leaf metadata fragment selected from the plurality of metadata fragments, a metadata fragment that includes a newer version compared to a version of a corresponding metadata fragment of the metadata tree; and generating the response to include the metadata fragment that includes the newer version.

12. The method of claim 10, further comprising:

identifying, with respect to the metadata tree, starting from a leaf metadata fragment selected from the plurality of metadata fragments, an edge of the dependency tree that includes a newer version compared to a version of a corresponding edge of the metadata tree; and generating the response to include the edge that includes the newer version.

13. The method of claim 10, further comprising:

identifying, starting from a leaf metadata fragment selected from the plurality of metadata fragments, a metadata fragment that includes a newer version compared to the previous version;

identifying, from the dependency tree, a subtree below the metadata fragment which includes the newer version; and generating the another response to include the metadata fragment that includes the newer version and the subtree.

14. The method of claim 10, further comprising:

identifying, starting from a leaf metadata fragment selected from the plurality of metadata fragments, an edge of the dependency tree that includes a newer version compared to the previous version;

identifying, from the dependency tree, a subtree below the edge that includes the newer version; and generating the another response to include the edge and the subtree.

15. The method of claim 10, further comprising:

generating, based on the query and the dependency tree, the response to include the update that includes another modification to a metadata fragment dependency of the metadata.

16. A non-transitory computer readable medium having stored thereon machine readable instructions to provide dependency-based metadata retrieval and update, the machine readable instructions, when executed, cause a processor to:

generate a query for an update of metadata associated with an application, wherein the query includes at least one of:

a previous version associated with a previous synchronization of the metadata, or a metadata tree associated with the metadata;

receive, based on the query and a dependency tree, a response to include the update that includes a modification to a metadata fragment of the metadata, wherein the dependency tree includes a parent and child relationship between each of a plurality of metadata fragments including the metadata fragment, and further includes versions associated with the plurality of metadata fragments;

determine whether the metadata associated with the application is to be modified based upon the received response;

generate another query for another update of the metadata associated with the application, wherein the another query includes the metadata tree associated with the metadata; and receive, based on the another query and the dependency tree, another response to include the another update that includes another modification to the metadata fragment of the metadata.

17. The non-transitory computer readable medium according to claim 16, wherein the machine readable instructions are further to cause the processor to:

generate, prior to generation of the query for the update, an initial query to retrieve the metadata and dependencies associated with the plurality of metadata fragments of the metadata; and receive, based on the initial query and at least on the dependency tree, the metadata and the dependencies associated with the plurality of metadata fragments of the metadata.

18. The non-transitory computer readable medium according to claim 16, wherein the previous version includes at least one of:

a version number that is modified based on an update associated with the metadata fragment in the dependency tree, or a timestamp associated with creation or modification of the metadata fragment in the dependency tree.

19. The non-transitory computer readable medium according to claim 16, wherein for the query that includes the previous version associated with the previous synchronization of the metadata, the query includes at least two metadata fragments from the plurality of metadata fragments, and the previous version represents an oldest version associated with a metadata fragment from the at least two metadata fragments.

* * * * *